UNITED STATES PATENT OFFICE.

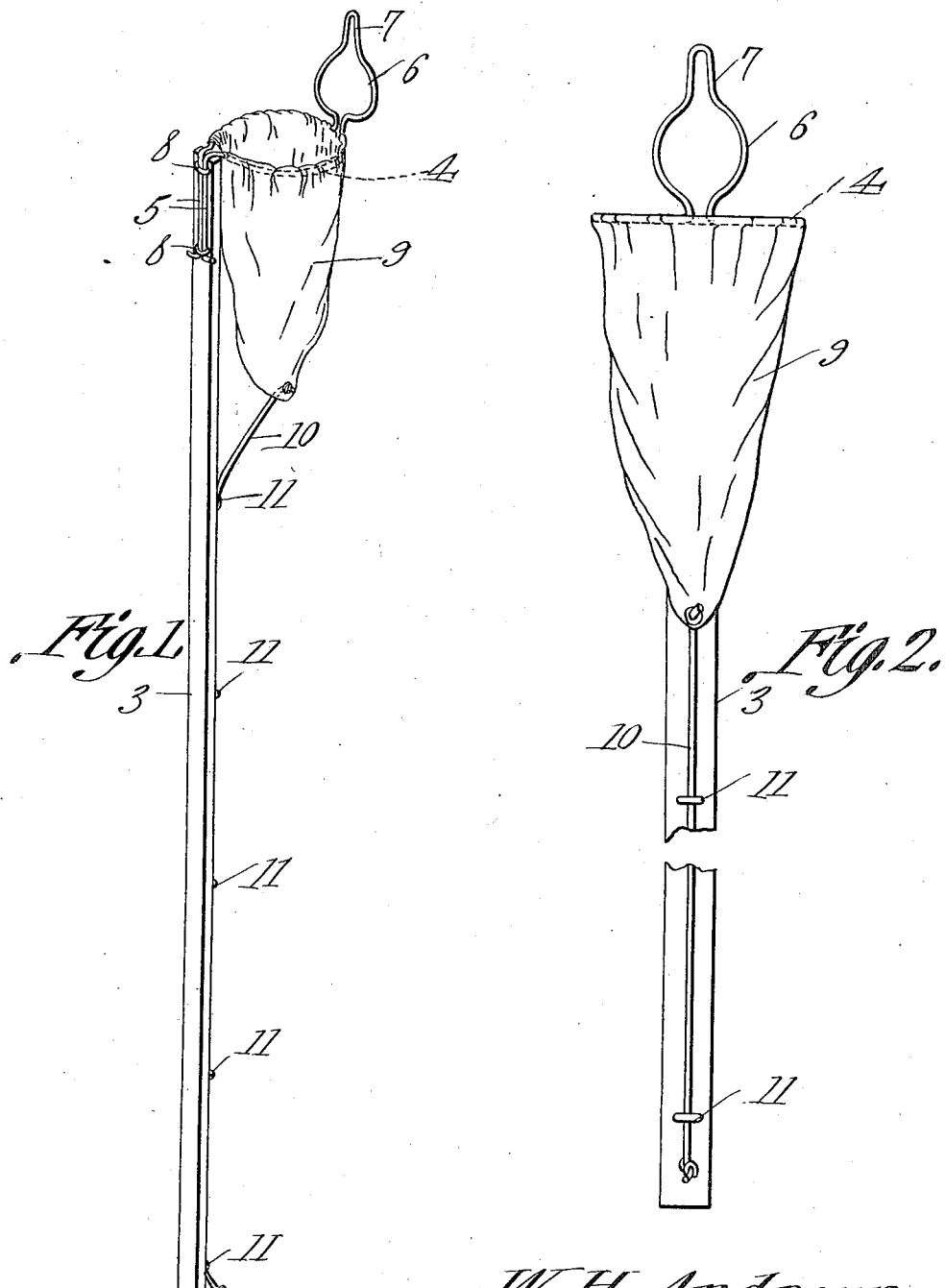

WILLIAM H. ANDREWS, OF ATLANTA, GEORGIA.

FRUIT-PICKER.

1,093,097. Specification of Letters Patent. Patented Apr. 14, 1914.

Application filed June 24, 1912. Serial No. 705,602.

*To all whom it may concern:*

Be it known that I, WILLIAM H. ANDREWS, a citizen of the United States, residing at Atlanta, in the county of Dekalb and State of Georgia, have invented a new and useful Fruit-Picker, of which the following is a specification.

This invention relates to fruit pickers, and aims to provide a convenient and efficient device whereby an operator may pick and gather the fruit from a tree, while standing on the soil, and with ease and despatch.

As a further object, the present invention contemplates the production of a device of the character indicated which shall be simple, substantial, durable and inexpensive in construction, and which may be readily manipulated to pluck the fruit, whereby the fruit drops into a bag and whereby when the bag is lowered, the same will be closed, means being provided for swinging the bag after the same has been lowered to empty the fruit therefrom.

With the foregoing general objects outlined and other objects in view, which will be apparent as the invention is better understood, the present invention resides in the novel construction and combination of parts hereinafter set forth and claimed, it being understood that this device is susceptible of alterations or deviations in its details within the scope of the appended claim without departing from the spirit of the invention.

The invention has been illustrated in its preferred embodiment in the accompanying drawings, wherein;—

Figure 1 is a perspective view of the fruit picker; Fig. 2 is a front elevation thereof on an enlarged scale, parts being broken away.

Referring specifically to the drawings, the numeral 3 designates the pole or staff, which may be of any suitable length, and which is preferably of wood or similar material, although it is understood that the same may be constructed of any suitable material. To the upper or outer end of the staff 3, there is attached a combined bag holder and fruit detaching member, which is bent from a single length of wire, and comprises a pair of semi-circular sections forming the ring 4, complementary angular tangs or ends 5 projecting from adjoining ends of the sections, and an open circular loop 6 attached at its ends to the other adjoining ends of the sections. The angular tangs 5 extend over the end of the staff and are secured to the side of the staff by means of staples 8, so that the ring 4 is disposed at right angles to the staff, or in the plane of the end of the staff. The ends of the loop 6 being attached to the adjoining ends of the sections of the ring 4 provide a contracted mouth and the outer or intermediate portion of the loop 6 is contracted into a V-shaped extension 7. The loop 6 is disposed at right angles to the ring 4, and stands upwardly. A bag 9 is hung from the ring 4 and to its lower end, which is closed and pointed is secured a cord or other flexible member 10, which is guided along the staff 3 to its inner or lower end by means of eyes 11. The ring 4 is arranged at right angles to the staff or in the plane of the outer or upper end thereof, and the bag 9 depends from the ring 4 along the staff 3.

In use, the device is manipulated by the operator who grasps the staff 3 at its lower or inner end, and by the proper manipulation of the staff 3, the loop 6 is passed over or around the fruit to be plucked, and the staff is then drawn downwardly or away from the fruit, so that the branch or twig entering the contracted extension 7 of the loop will cause the fruit to be severed from its branch or twig so as to drop into the bag 9. Thus, by the manipulation of the staff 3, the operator may pluck the fruit in a convenient and effective manner from trees of various sizes, while standing on the soil, and the fruit will be gathered in the bag 9. When the upper end of the staff 3 is swung downwardly or to a horizontal position to bring the bag 9 adjacent the soil, the bag 9 will remain in a vertical position and will swing away from the staff into the plane of the ring 4, so as to prevent the fruit from dropping from the bag, it being understood that the cord 10 is ordinarily slackened to permit the bag to swing. Then in order to empty or dump the fruit, the cord 10 may be drawn taut which will raise the bottom or lower end of the bag, the elevation of which will cause the fruit to roll out of the bag 9 and into a basket or other receptacle which may be provided. The fruit may not only be severed by engaging the extension 7 over the stem of the fruit after the fruit has been passed through the loop 6, but it is to be observed that the staff may be moved upward after the loop 6 has been passed over the fruit, so that the stem of the fruit may be received by the contracted mouth of the loop 6, so that the fruit may be severed and may drop immediately into the bag 9. Thus, a double function is provided, the fruit being adapted to be severed by the movement of the staff in either direction, which ever is most desirable or most efficient according to the circumstances.

From the foregoing, taken in connection with the drawings, it will be apparent that the objects aimed at are attained in a satisfactory manner and that the present device provides a desirable one for the purposes to which it is designed.

Having thus described the invention, what is claimed as new is:—

In a fruit picker, a combination bag support and fruit detaching member fashioned from a length of wire, the intermediate portion of the wire being bent to form a loop adapted to pass over the fruit, the loop having a contracted fruit severing mouth and a contracted fruit severing extension opposite the mouth, the wire being bent from the mouth of the loop to form semi-circular sections constituting a bag supporting ring, the said ring and loop being disposed in planes at right angles to each other, and the wire being bent angularly from the said semi-circular sections, the said angular portions constituting the terminal portions of the wire and providing means for the attachment of a handle.

In testimony that I claim the foregoing as my own, I have hereto affixed my signature in the presence of two witnesses.

WILLIAM H. ANDREWS.

Witnesses:
V. D. EDWARDS,
A. E. HOLLIDAY.

Copies of this patent may be obtained for five cents each, by addressing the "Commissioner of Patents, Washington, D. C."